US008429369B2

(12) United States Patent
Ogihara et al.

(10) Patent No.: US 8,429,369 B2
(45) Date of Patent: Apr. 23, 2013

(54) STORAGE MANAGEMENT PROGRAM, STORAGE MANAGEMENT METHOD, AND STORAGE MANAGEMENT APPARATUS

(75) Inventors: Kazutaka Ogihara, Kawasaki (JP); Yasuo Noguchi, Kawasaki (JP); Yoshihiro Tsuchiya, Kawasaki (JP); Masahisa Tamura, Kawasaki (JP); Tetsutaro Maruyama, Kawasaki (JP); Kazuichi Oe, Kawasaki (JP); Takashi Watanabe, Kawasaki (JP); Tatsuo Kumano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 373 days.

(21) Appl. No.: 12/585,010

(22) Filed: Aug. 31, 2009

(65) Prior Publication Data

US 2009/0327642 A1    Dec. 31, 2009

Related U.S. Application Data

(63) Continuation of application No. PCT/JP2007/055740, filed on Mar. 20, 2007.

(51) Int. Cl.
*G06F 12/00* (2006.01)
(52) U.S. Cl.
USPC ............. 711/170; 711/114; 711/E12.002
(58) Field of Classification Search .......... 711/114, 711/170
See application file for complete search history.

(56) References Cited

U.S. PATENT DOCUMENTS

| 6,772,304 | B2 * | 8/2004 | Hino et al. ............. 711/162 |
| 7,409,496 | B2 | 8/2008 | Kanie et al. |
| 2003/0200275 | A1 | 10/2003 | Hirabayashi et al. |
| 2004/0064633 | A1 | 4/2004 | Oota |
| 2006/0101215 | A1 * | 5/2006 | Yuasa ............. 711/162 |
| 2006/0107013 | A1 * | 5/2006 | Ripberger ............. 711/170 |
| 2006/0195670 | A1 * | 8/2006 | Iwamura et al. ............. 711/162 |
| 2006/0242373 | A1 * | 10/2006 | Hirakawa et al. ............. 711/162 |

FOREIGN PATENT DOCUMENTS

| JP | 06-187101 | 7/1994 |
| JP | 2003-316633 | 11/2003 |
| JP | 2004-126716 | 4/2004 |
| JP | 2006-99748 A | 4/2006 |
| JP | 2006-309318 A | 11/2006 |
| JP | 2007-018407 | 1/2007 |

OTHER PUBLICATIONS

Patent Abstracts of Japan, Publication No. 07-261945, Published Oct. 13, 1995.
Patent Abstracts of Japan, Publication No. 06-187101, Published Jul. 8, 1994.

(Continued)

*Primary Examiner* — Reginald Bragdon
*Assistant Examiner* — Aracelis Ruiz
(74) *Attorney, Agent, or Firm* — Fujitsu Patent Center

(57) ABSTRACT

In a computer executing processes based on a storage management program, an attribute collection unit collects attributes of storage nodes. A group creation unit creates at least two groups that include the storage nodes, in accordance with the attributes of the storage nodes collected by the attribute collection unit. A data allocation unit allocates distributed data and redundant distributed data to the groups created by the group creation unit in such a manner that the distributed data and the redundant distributed data having the same content as the distributed data are placed in different groups.

18 Claims, 11 Drawing Sheets

OTHER PUBLICATIONS

Patent Abstracts of Japan, Publication No. 2005-004681, Published Jan. 6, 2005.
Patent Abstracts of Japan, Publication No. 2007-018407, Published Jan. 25, 2007.
Patent Abstracts of Japan, Publication No. 2003-316633, Published Nov. 7, 2003.
Patent Abstracts of Japan, Publication No. 2004-126716, Published Apr. 22, 2004.
Japanese Office Action mailed Mar. 27, 2012 for corresponding Japanese Application No. 2009-505040, with Partial English-language Translation.
Partial English-language Translation of JP-2007-18407-A.

* cited by examiner

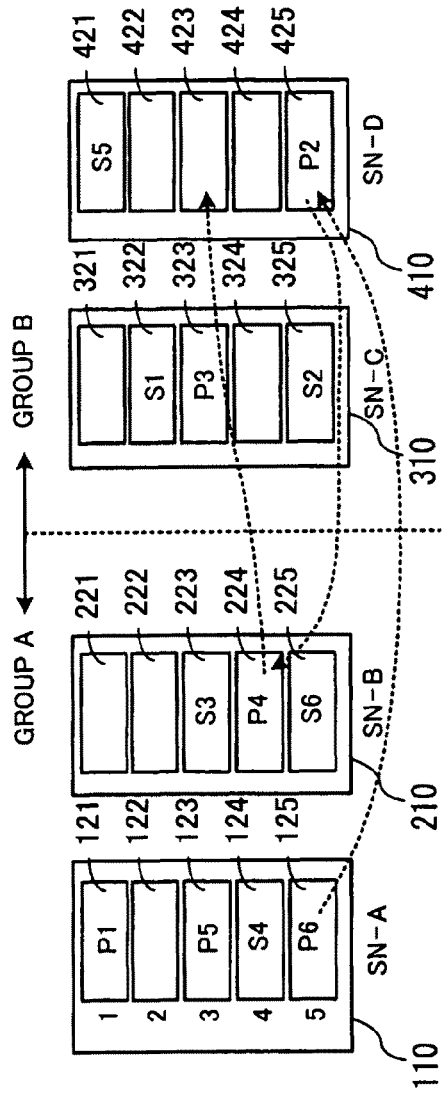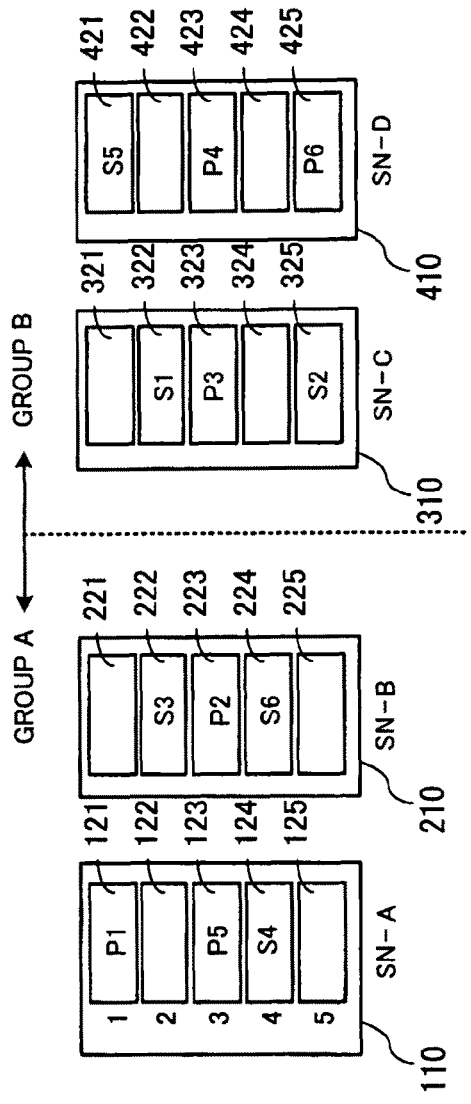

STORAGE MANAGEMENT PROGRAM, STORAGE MANAGEMENT METHOD, AND STORAGE MANAGEMENT APPARATUS

This application is a continuing application, filed under 35 U.S.C. Section 111(a), of International Application PCT/JP2007/055740, filed Mar. 20, 2007.

FIELD

The embodiment discussed herein is related to storage management programs, storage management methods, and storage management apparatuses.

BACKGROUND

Storage systems having a plurality of storage devices are used to store and manage large amounts of data generated in many places, the data being stored in the storage devices in a distributed (multiplexed) manner. As the range of applications and the amount of information have been increasing in recent years, a greater storage capacity, more reliable services, and reliability and security solutions are demanded. One known storage system performs a distributed failure recovery process in accordance with the level of risk of losing data and the degree of performance degradation at a failure (refer to Japanese Laid-open Patent Publication No. 07-261945, for example).

One known example of the storage system is an organic storage which duplicates or moves data in accordance with the judgment made by the storage system itself. A general organic storage allocates a logical volume, and the user accesses the logical volume. The logical volume is formed by a plurality of segments, and each segment is formed by two slices. The slice is a partition of a predetermined size, formed by dividing a disk space provided by a storage node. A segment is formed by slices contained in different storage nodes. The slices forming the segment are divided into two types: a primary slice and a secondary slice.

The primary slice and the secondary slice are allocated with little consideration given to the attributes of the individual storage nodes (years of use, operation time, operating environment, etc.). For example, a new node and an old node could be handled in the same way, regardless of years of use. Redundant data might be kept by old storage nodes even though the old storage nodes generally have a high risk of failure. Keeping redundant data in the old storage nodes will increase the risk of losing data because the two nodes could go wrong in the same period.

SUMMARY

According to an aspect of the present invention, a computer-readable recording medium having a storage management program recorded thereon makes a plurality of storage nodes in a distributed storage system manage storage devices, the storage nodes being provided to perform distributed management of distributed data formed by distributing data and redundant distributed data formed by distributing redundant data having the same content as the data and connected through a network. The program makes a computer function as an attribute collection unit which collects attributes of the storage nodes; a group creation unit which creates at least two groups that include the storage nodes in accordance with the attributes of the storage nodes collected by the attribute collection unit; and a data allocation unit which allocates the distributed data and the redundant distributed data to the groups created by the group creation unit such that the distributed data and the redundant distributed data having the same content as the distributed data are placed in different groups.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIGS. 10A and 10B are diagrams illustrating examples of the process of moving the distributed data.

DESCRIPTION OF EMBODIMENT(S)

An embodiment of the present invention will be described in detail with reference to the drawings.

First, the outline of the present invention will be described. Then, the embodiment will be described.

Figure 1:
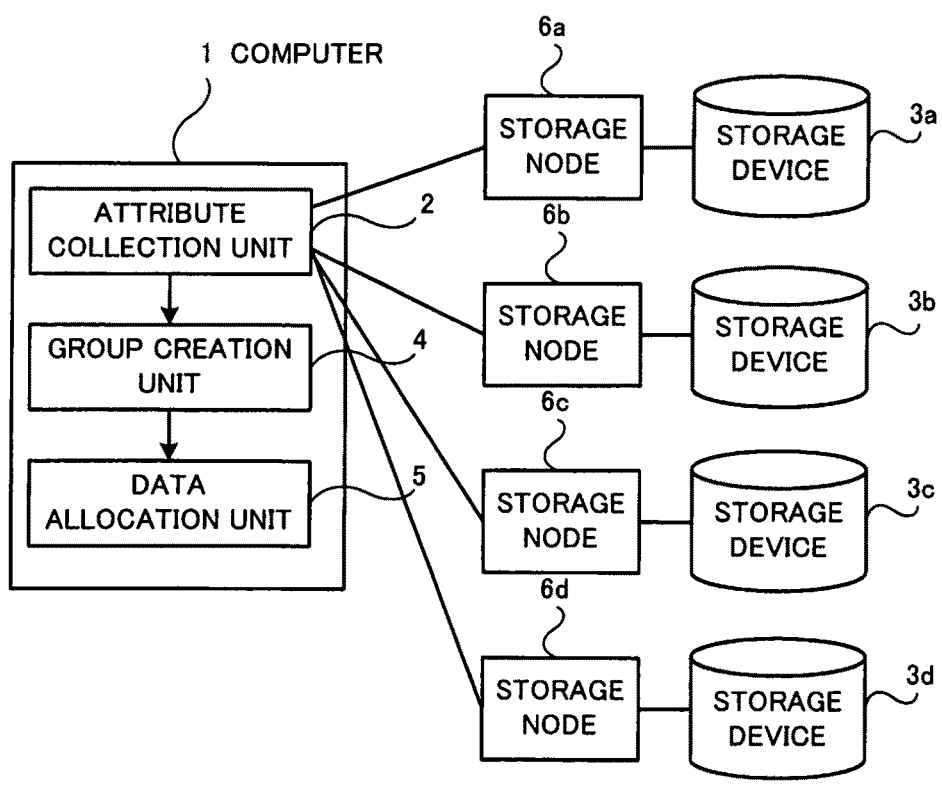
FIG. 1 is a diagram illustrating an outline of the present invention.

FIG. 1 is a diagram illustrating an outline of the present invention.

A distributed storage system has a computer 1, storage nodes 6a to 6d, and storage devices 3a to 3d.

The storage nodes 6a to 6d are connected to the computer 1.

The computer 1 allows the storage nodes 6a to 6d to manage the storage devices 3a to 3d.

The storage nodes 6a to 6d are provided to perform distributed management of distributed data formed by distributing data and redundant distributed data formed by distributing redundant data having the same content as the data, and the nodes are connected through a network. The storage nodes 6a to 6d are connected to the storage devices 3a to 3d, where the distributed data and the redundant distributed data are stored.

The computer 1 includes an attribute collection unit 2, a group creation unit 4, and a data allocation unit 5.

The attribute collection unit 2 collects the attributes of the storage nodes 6a to 6d. The attributes include attributes concerning the storage devices 3a to 3d managed by the storage nodes. The attributes are not limited and may include the date of manufacture, operation time, operating environment, and ambient temperature, for instance.

The group creation unit 4 creates at least two groups that include the storage nodes 6a to 6d, on the basis of the attributes of the storage nodes 6a to 6d collected by the attribute collection unit 2.

The data allocation unit 5 allocates distributed data and redundant distributed data to the groups created by the group creation unit 4 in such a manner that a distributed data item and the redundant distributed data item having the same content as the distributed data item will be placed in different groups.

According to such a computer 1, the attribute collection unit 2 collects the attributes of the storage nodes 6a to 6d. The group creation unit 4 creates at least two groups that include the storage nodes 6a to 6d, on the basis of the attributes of the storage nodes 6a to 6d collected by the attribute collection unit 2.

The data allocation unit 5 allocates the distributed data and the redundant distributed data to the groups created by the group creation unit 4 in such a manner that a distributed data item and the redundant distributed data item having the same content as the distributed data item will be placed in different groups.

An embodiment of the present invention will be described.

Figure 2:
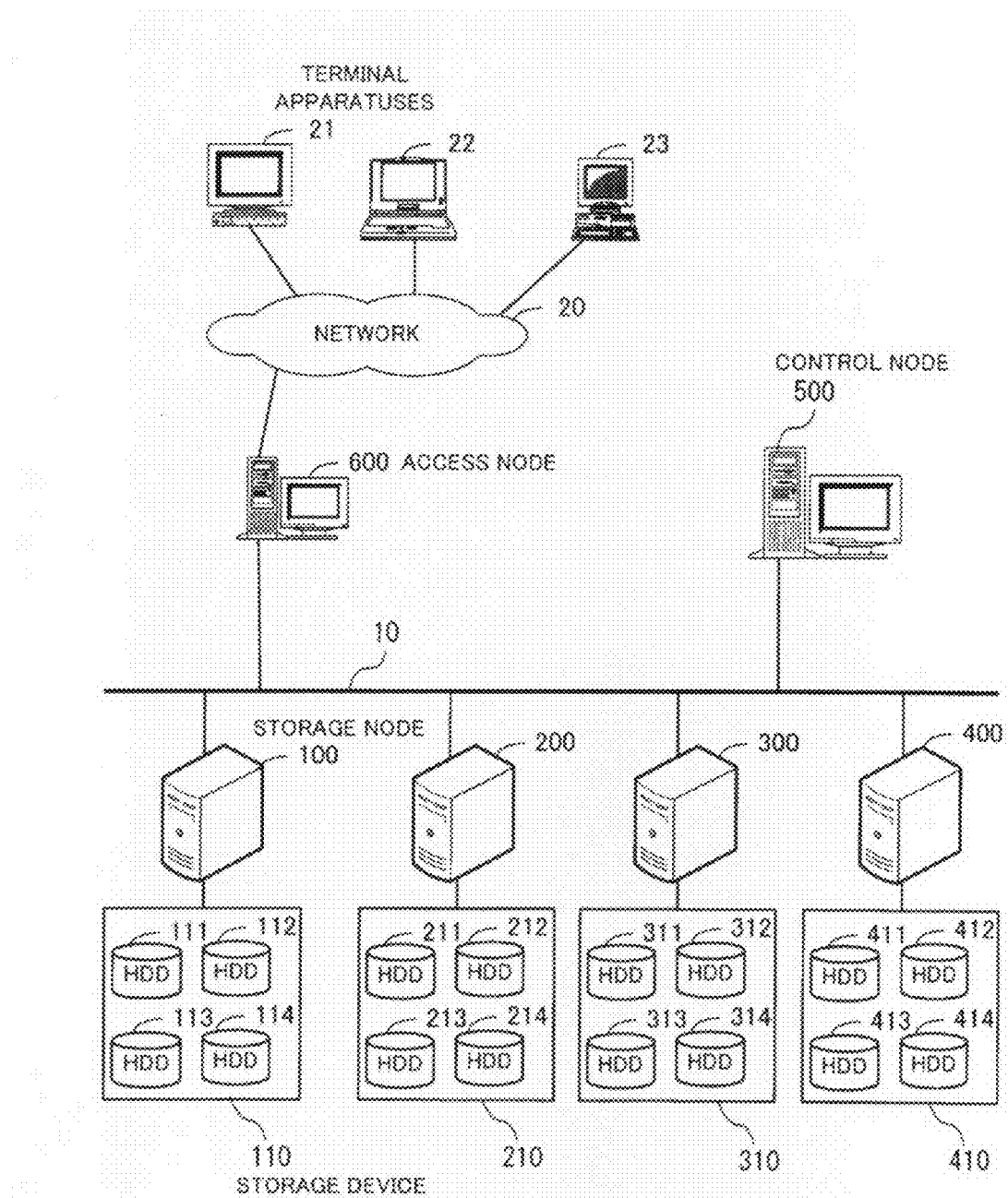
FIG. 2 is a diagram illustrating an example structure of a distributed storage system of an embodiment.

FIG. 2 is a diagram illustrating an example structure of a distributed storage system of the embodiment. In the embodiment, a plurality of storage nodes 100, 200, 300, and 400, a control node 500, and an access node 600 are connected through a network 20. The storage nodes 100, 200, 300, and 400 are connected to storage devices 110, 210, 310, and 410, respectively.

The storage device 110 includes a plurality of hard disk drives (HDDs) 111, 112, 113, and 114. The storage device 210 includes a plurality of HDDs 211, 212, 213, and 214. The storage device 310 includes a plurality of HDDs 311, 312, 313, and 314. The storage device 410 includes a plurality of HDDs 411, 412, 413, and 414. The storage devices 110, 210, 310, 410 are RAID systems using the built-in HDDs. This embodiment provides a RAID-5 disk management service with the storage devices 110, 210, 310, and 410.

The storage nodes 100, 200, 300, and 400 are computers having an architecture known as the Intel Architecture (IA), for instance. The storage nodes 100, 200, 300, and 400 manage distributed data stored in the connected storage devices 110, 210, 310, and 410, respectively.

The storage nodes 100, 200, 300, and 400 also manage redundant distributed data. Different storage nodes manage distributed data items having the same content.

The storage nodes 100, 200, 300, and 400 perform a redundancy protection process to confirm the consistency of duplicated distributed data. The storage nodes 100, 200, 300, and 400 may perform a data redundancy protection process based on their individual decisions or may perform the data redundancy protection process based on an instruction given from the outside. In this embodiment, the redundancy protection process is performed in accordance with an instruction given by the control node 500. The data redundancy protection process will be referred to as patrol hereinafter.

In the patrol process, the storage nodes holding the duplicated distributed data communicate with each other to confirm the consistency of the distributed data. If a problem is found in the distributed data managed by a certain storage node, the corresponding distributed data (redundant distributed data) in another storage node will be used to restore the data.

The control node 500 manages the storage nodes 100, 200, 300, and 400 through heart-beat communication with the storage nodes 100, 200, 300, and 400. For example, the control node 500 outputs a patrol instruction to the storage nodes 100, 200, 300, and 400 at predetermined timing.

A plurality of terminal apparatuses 21, 22, and 23 are connected to the access node 600 via the network 20.

The access node 600 creates distributed data by splitting received data into predetermined unit blocks and sends a write request to the storage node 100, 200, 300, or 400. Receiving the write request, the storage node 100, 200, 300, or 400 selects one of the storage nodes 100, 200, 300, and 400 that becomes the partner of data duplication, in accordance with its slice management information, and sends a write request to that storage node. Receiving the write request, the selected storage node schedules the writing of the distributed data into the storage device connected to itself and returns a response to the storage node which has sent the write request. Receiving the response, the storage node schedules the same writing of the distributed data and returns a response to the access node 600.

The access node 600 recognizes the storage locations of distributed data managed by the storage nodes 100, 200, 300, and 400 and makes data access to the storage nodes 100, 200, 300, and 400 in response to a request sent from the terminal apparatus 21, 22, or 23.

Figure 3:
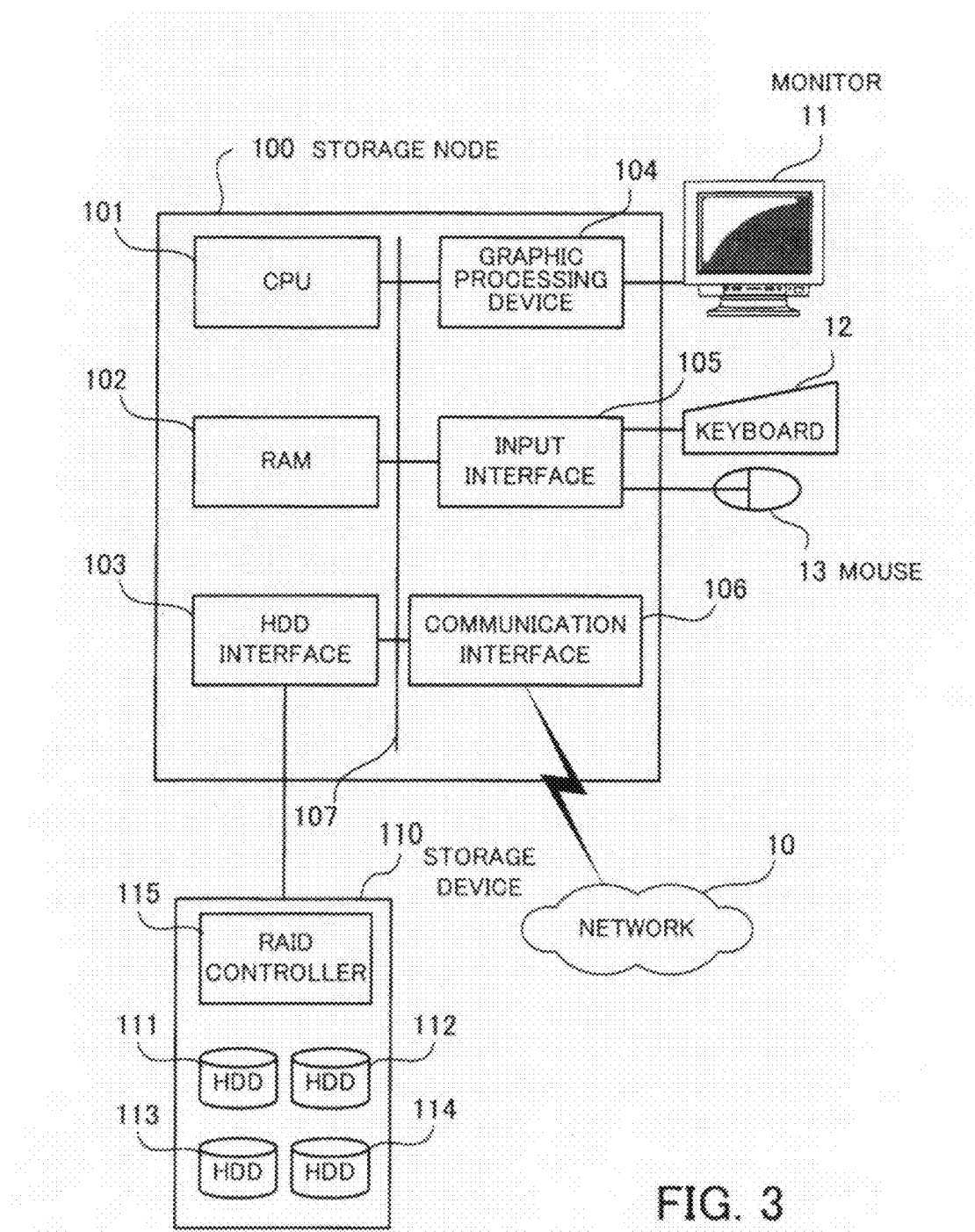
FIG. 3 is a diagram illustrating an example hardware structure of a storage node used in the embodiment.

FIG. 3 is a diagram illustrating an example hardware structure of the storage node used in the embodiment. The whole of the storage node 100 is controlled by a central processing unit (CPU) 101. A random access memory (RAM) 102, an HDD interface 103, a graphic processing device 104, an input interface 105, and a communication interface 106 are connected to the CPU 101 via a bus 107.

The RAM 102 temporarily stores at least a part of the operating system (OS) or an application program to be executed by the CPU 101. The RAM 102 also stores a variety of data necessary for processing by the CPU 101.

The HDD interface 103 is connected to the storage device 110. The HDD interface 103 communicates with a RAID controller 115 included in the storage device 110, to input and output distributed data to or from the storage device 110. The RAID controller 115 in the storage device 110 has RAID-0 to RAID-5 functions and manages the plurality of HDDs 111 to 114 as a single hard disk drive.

The graphic processing device 104 is connected to a monitor 11. The graphic processing device 104 displays an image on the screen of the monitor 11 in accordance with an instruction from the CPU 101. The input interface 105 is connected to a keyboard 12 and a mouse 13. The input interface 105 passes a signal sent from the keyboard 12 or the mouse 13 to the CPU 101 through the bus 107.

The communication interface 106 is connected to a network 10. The communication interface 106 exchanges data with another computer through the network 10.

With the hardware structure described above, the processing functions of the embodiment can be implemented. FIG. 3 illustrates the structure of the storage node 100 and the storage device 110. The other storage nodes 200, 300, and 400 and the other storage devices 210, 310, and 410 can be implemented with the same hardware structure.

The control node 500, the access node 600, and the terminal apparatuses 21 to 23 can also be implemented with the same hardware structure as the combination of the storage node 100 and the storage device 110. The control node 500, the access node 600, and the terminal apparatuses 21 to 23 may not form a RAID system as formed in the storage device 110 and may have discrete HDDs connected to an HDD controller.

As illustrated in FIG. 2, the plurality of storage nodes 100, 200, 300, and 400 are connected to the network 10, and the storage nodes 100, 200, 300, and 400 communicate with each other. This distributed storage system functions as a virtual volume (hereinafter called a logical volume) to the terminal apparatuses 21 to 23.

Figure 4:
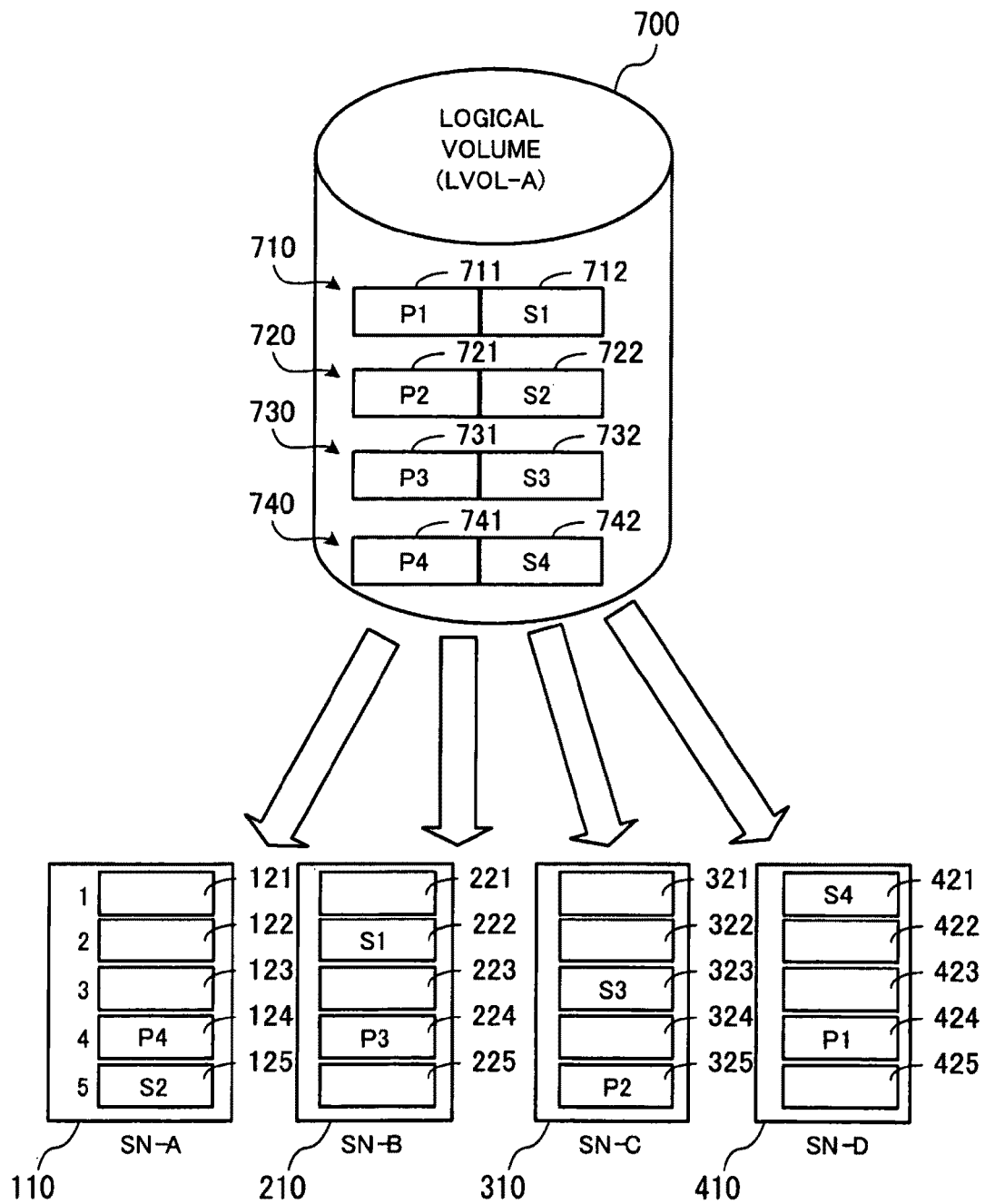
FIG. 4 is a diagram illustrating the data structure of a logical volume.

FIG. 4 is a diagram illustrating the data structure of the logical volume.

A logical volume 700 is given an identifier (logical volume identifier) 'LVOL-A'. The four storage nodes 100, 200, 300, and 400 connected via the network are given node identifiers 'SN-A', 'SN-B', 'SN-C', and 'SN-D', respectively, for the purpose of identifying the storage nodes.

The storage devices 110, 210, 310, and 410 provided to the storage nodes 100, 200, 300, and 400 have a RAID-5 logical disk each. The logical disk is divided into five slices, and the slices are managed in the individual storage nodes.

In the example illustrated in FIG. 4, the storage area in the storage device 110 is divided into five slices 121 to 125. The storage area in the storage device 210 is divided into five slices 221 to 225. The storage area in the storage device 310 is divided into five slices 321 to 325. The storage area in the storage device 410 is divided into five slices 421 to 425.

The logical volume 700 has segments 710, 720, 730, and 740. The storage capacity of the segments 710, 720, 730, and 740 is the same as the storage capacity of a slice, which is the management unit in the storage devices 110, 210, 310, and 410. If the slice has a storage capacity of one gigabyte, the storage capacity of the segment is also one gigabyte. The storage capacity of the logical volume 700 is an integral multiple of the storage capacity of a single segment. If the storage capacity of the segment is one gigabyte, the storage capacity of the logical volume 700 is four gigabytes.

The segments 710, 720, 730, and 740 have primary slices 711, 721, 731, and 741 and secondary slices 712, 722, 732, and 742 respectively. The slices in a single segment have data of the same content, and are associated with different storage nodes. An area for managing each slice has a logical volume identifier, segment information, slice information of the same segment, and a flag. The flag has a value representing whether the slice is a primary or secondary slice.

In the example illustrated in FIG. 4, a slice identifier is a combination of an alphabetical character 'P' or 'S' and a number. 'P' represents a primary slice, and 'S' represents a secondary slice. The number following the alphabetical character represents the place of the segment. For example, the primary slice of the first segment 710 is represented by 'P1', and the secondary slice is represented by 'S1'.

The primary slices and secondary slices of the logical volume 700 structured as described above are each associated with any slice in the storage devices 110, 210, 310, and 410. For example, the primary slice 711 of the segment 710 is associated with the slice 424 of the storage device 410, and the secondary slice 712 is associated with the slice 222 of the storage device 210.

The storage devices 110, 210, 310, and 410 store distributed data of the primary slice or the secondary slice corresponding to their own slice.

Figure 5:
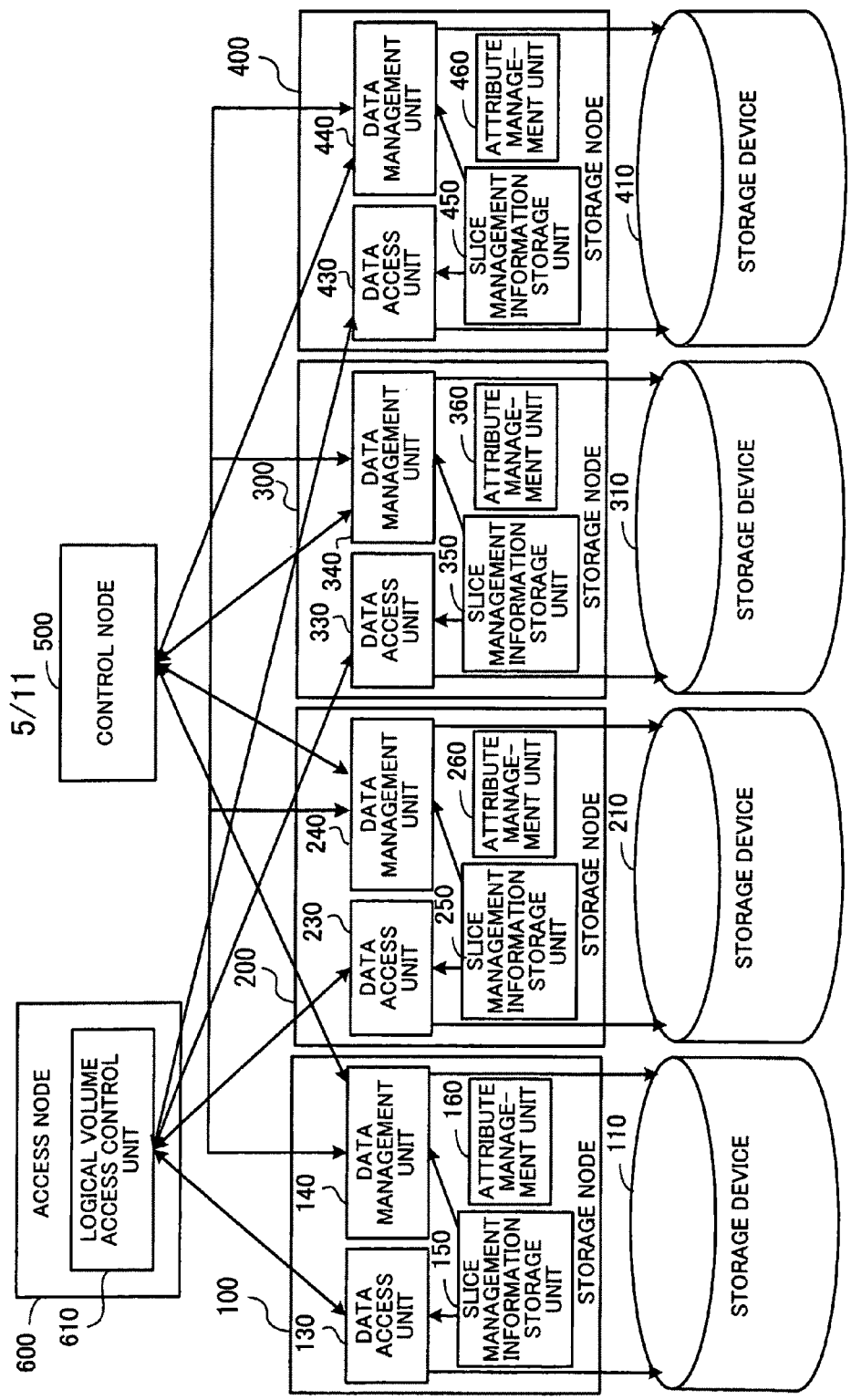
FIG. 5 is a block diagram illustrating functions of components in the distributed storage system.

FIG. 5 is a block diagram illustrating functions of devices in the distributed storage system.

The access node 600 has a logical volume access control unit 610. In response to an access request specifying data in the logical volume 700, sent from the terminal apparatus 21, 22, or 23, the logical volume access control unit 610 makes data access to a storage node managing corresponding distributed data. More specifically, the logical volume access control unit 610 stores the correspondence between the primary or secondary slice in each segment of the logical volume 700 and a slice in the storage device 110, 210, 310, or 410. Receiving an in-segment data access request from the terminal apparatus 21, 22, or 23, the logical volume access control unit 610 makes data access to the storage device that includes the slice corresponding to the primary slice of the corresponding segment.

Figure 6:
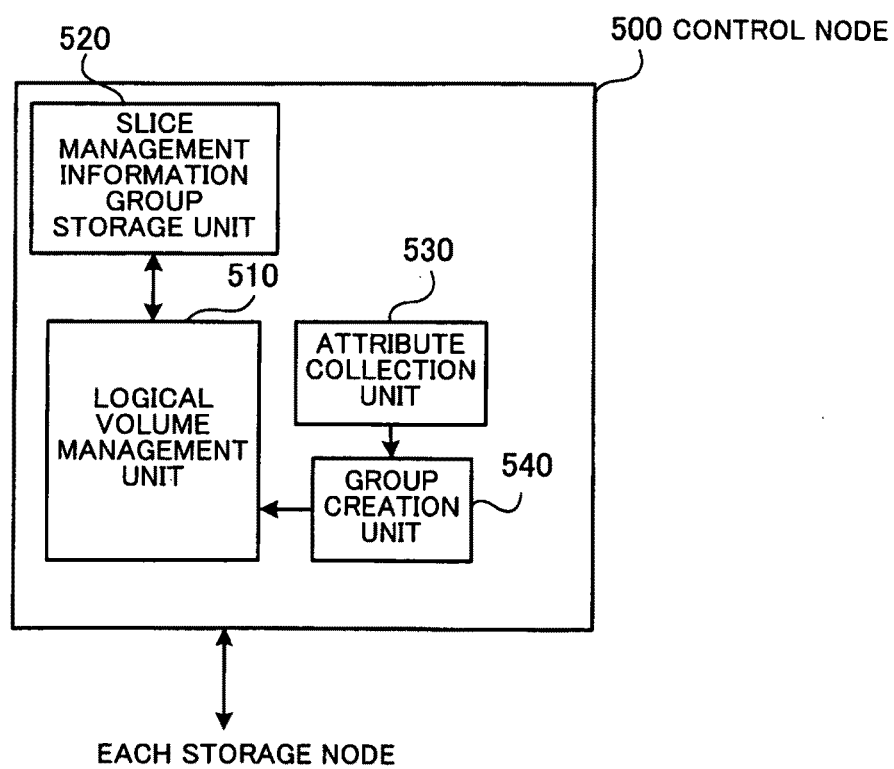
FIG. 6 is a block diagram illustrating functions of a control node.

FIG. 6 is a block diagram illustrating functions of the control node.

The control node 500 includes a logical volume management unit 510, a slice management information group storage unit 520, an attribute collection unit 530, and a group creation unit 540.

The logical volume management unit 510 manages the slices in the storage devices 110, 210, 310, and 410 provided in the storage nodes 100, 200, 300, and 400. For example, when the system starts, the logical volume management unit 510 sends slice management information acquisition requests to the storage nodes 100, 200, 300, and 400. The logical volume management unit 510 then stores the slice management information returned in response to the slice management information acquisition requests, in the slice management information group storage unit 520.

The logical volume management unit 510 manages a patrol execution timing for each segment in the logical volume 700. Patrol can be executed at predetermined time intervals or at a scheduled time. Patrol can also be executed in a low-load period obtained by monitoring the load status of the distributed storage system. At the patrol execution time, the logical volume management unit 510 sends a patrol execution instruction to the storage node managing the primary slice of the target segment.

Further, the logical volume management unit 510 has a function to move distributed data (reallocate slices) in accordance with the slice management information and a created group (described later).

The slice management information group storage unit 520 stores the slice management information collected from the storage nodes 100, 200, 300, and 400. For example, a part of the storage area of the RAM in the control node 500 is used as the slice management information group storage unit 520.

The attribute collection unit 530 collects the attributes of the storage nodes 100, 200, 300, and 400. The attribute collection unit 530 collects the attributes by inquiring of the storage nodes 100, 200, 300, and 400 about their attributes in a heart-beat communication channel.

The attributes to be collected are not limited and may include the hardware vendor of the storage nodes 100, 200, 300, and 400, the version of the OS, and so on, as well as the attributes mentioned earlier. The information of the storage devices 110, 210, 310, or 410 includes Self-Monitoring, Analysis, and Reporting Technology (S.M.A.R.T) information (turn-on period, sector reallocation count, etc.), for instance.

The group creation unit 540 groups the storage nodes 100, 200, 300, and 400, by using the attributes collected by the attribute collection unit 530. The grouping will be described later in detail.

The description with reference to FIG. 5 continues.

The storage node 100 includes a data access unit 130, a data management unit 140, a slice management information storage unit 150, and an attribute management unit 160.

The data access unit 130 accesses distributed data in the storage device 110 in response to a request from the access node 600. More specifically, when receiving a data read request from the access node 600, the data access unit 130 obtains the distributed data specified in the read request from the storage device 110 and sends the data to the access node 600. If a data write request is received from the access node 600, the data access unit 130 sends the distributed data included in the write request to another storage node for data duplication, receives a normal response, and then stores the data in the storage device 110.

The data management unit 140 manages the distributed data in the storage device 110. More specifically, the data management unit 140 patrols the distributed data in the storage device 110 in accordance with an instruction from the control node 500. To execute patrol, the data management unit 140 sends a check request message to the storage node managing the secondary slice corresponding to the target primary slice. Receiving a check request message from another storage node, the data management unit 140 patrols the distributed data in the specified slice.

In response to a slice management information acquisition request from the logical volume management unit 510, the data management unit 140 further sends the slice management information stored in the slice management information storage unit 150, to the logical volume management unit 510.

The slice management information storage unit 150 stores the slice management information. For example, a part of the storage area in the RAM 102 is used as the slice management information storage unit 150. The slice management information stored in the slice management information storage unit 150 is stored in the storage device 110 when the system stops and is read into the slice management information storage unit 150 when the system starts.

The attribute management unit 160 stores the attributes described earlier and adds the stored attributes to a heart-beat signal when the attributes are referred by the attribute collection unit 530.

The other storage nodes 200, 300, and 400 have the same functions as the storage node 100. The storage node 200 includes a data access unit 230, a data management unit 240, a slice management information storage unit 250, and an attribute management unit 260. The storage node 300 includes a data access unit 330, a data management unit 340, a slice management information storage unit 350, and an attribute management unit 360. The storage node 400 includes a data access unit 430, a data management unit 440, a slice management information storage unit 450, and an attribute management unit 460. The components of the storage node 200, 300, and 400 have the same function as the components having the same name in the storage node 100.

Figure 7:
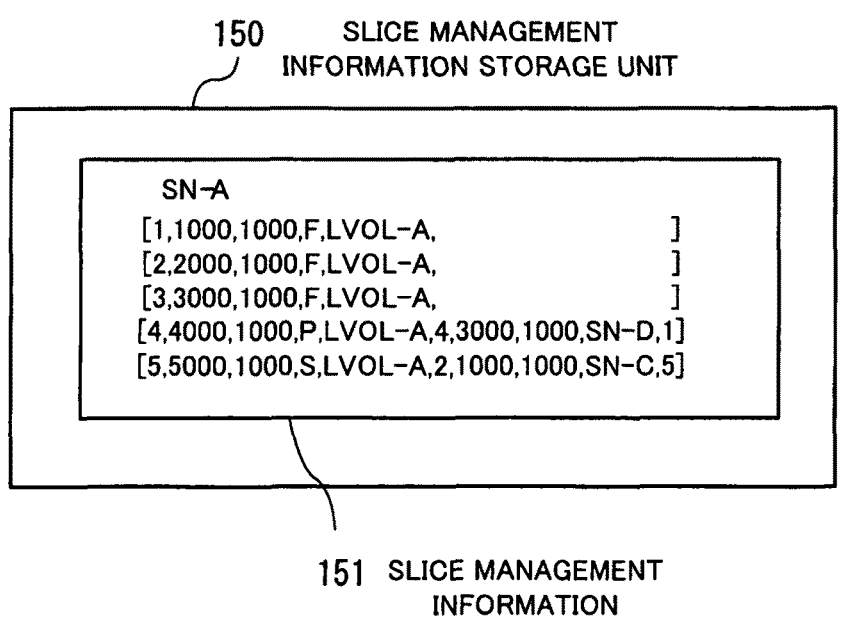
FIG. 7 is a view illustrating an example data structure of slice management information.

FIG. 7 is a view illustrating an example data structure of the slice management information.

The slice management information 151 stored in the slice management information storage unit 150 has the following elements, from left to right.

Slice number
Starting block position (block number of the first block of the slice)
Block count (number of blocks in the slice)
Flag (primary or secondary)
Logical volume identifier
Segment number
Logical volume starting block position
Block count in the logical volume
Paired storage node identifier
Paired slice number The slice management information 151 in FIG. 7 is included in the logical volume 700 illustrated in FIG. 4. For example, it means that the slice having a slice number '4' in the slice management information 151 of the node identifier 'SN-A' is the primary slice of the segment having a segment number '4' of 'LVOL-A' and is paired with the slice having a segment number '1' in the node of 'SN-D'. The flag of a slice which is not a primary slice nor a secondary slice is set to 'F' (free), and the fields following the logical volume identifier are left blank.

The same type of slice management information is stored in the slice management information storage units 250, 350, and 450 of the other storage nodes 200, 300, and 400. When the system starts, the control node 500 collects the slice management information from the storage nodes 100, 200, 300, and 400 and stores the information in the slice management information group storage unit 520.

Figure 8:
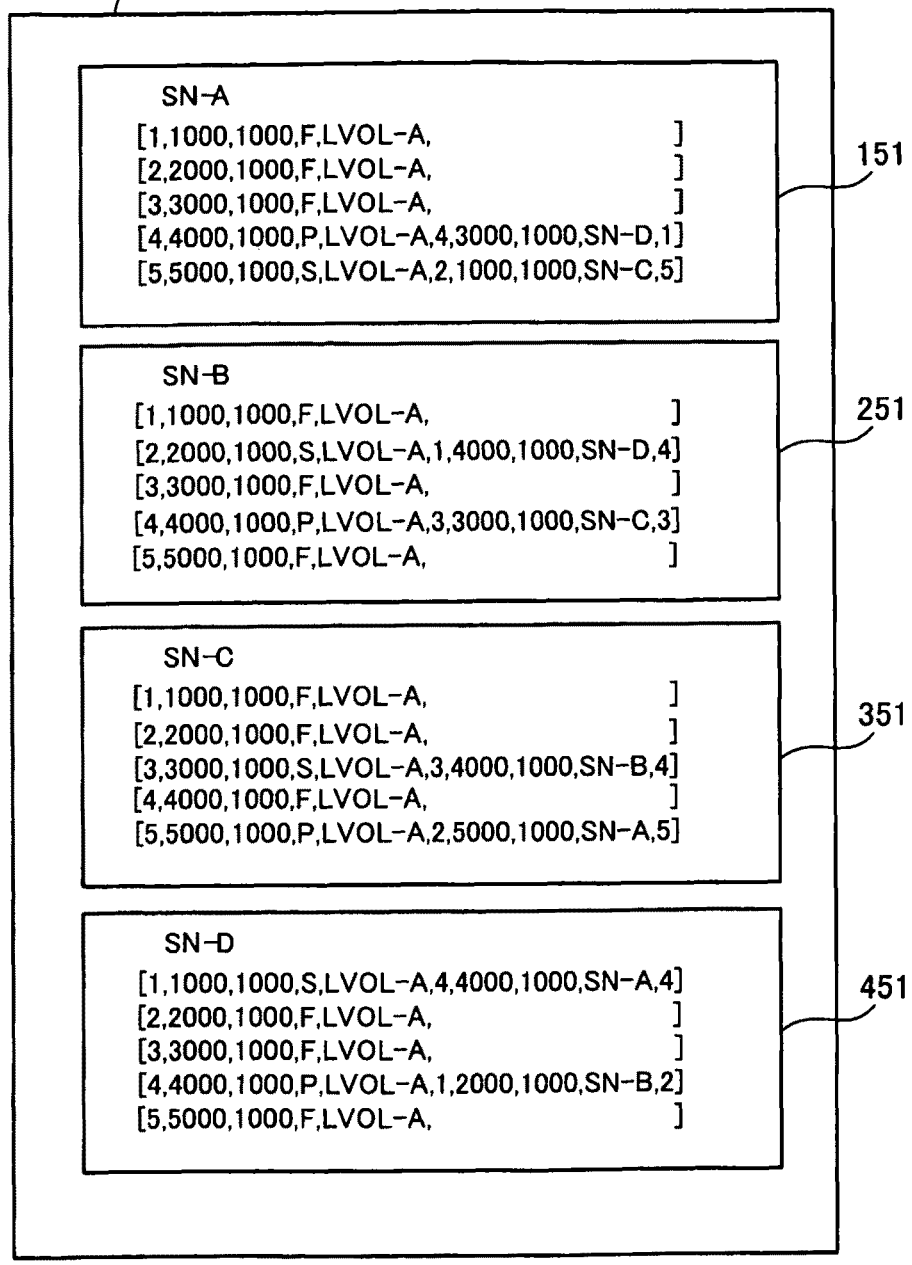
FIG. 8 is a view illustrating an example data structure in a slice management information group storage unit.

FIG. 8 is a view illustrating an example data structure in the slice management information group storage unit 520.

The slice management information group storage unit 520 stores the collected slice management information items 151, 251, 351, and 451. The slice management information item 151 is obtained from the storage node 100 (node identifier 'SN-A'). The slice management information item 251 is obtained from the storage node 200 (node identifier 'SN-B'). The slice management information item 351 is obtained from the storage node 300 (node identifier 'SN-C'). The slice management information item 451 is obtained from the storage node 400 (node identifier 'SN-D').

The function of the group creation unit 540 will be described next in detail.

If the collected attributes are discrete values, the group creation unit 540 creates two major groups by a first method described below. If the collected attributes are continuous values, the two major groups are created by a second or third method.

First Method

The group creation unit 540 creates minor groups of the storage nodes 100, 200, 300, and 400 by each discrete value. There are three or more minor groups.

The group creation unit 540 then creates two major groups by combining the minor groups. The two major groups are formed in such a manner that the difference in the number of storage devices is minimized.

For example, suppose that the attribute used for grouping is the version of the OS. If there are three OS-A storage nodes, four OS-B storage nodes, and one OS-C storage node, three minor groups are formed for the three versions. One major group is formed by the three OS-A storage nodes and the one OS-C storage node, and another major group is formed by the four OS-B storage nodes.

Second Method

The group creation unit 540 arranges the storage nodes 100, 200, 300, and 400, according to certain continuous values. The arranged storage nodes 100, 200, 300, and 400 are divided into two groups having an equal number of components.

For example, suppose that there are six storage nodes; the obtained attribute is elapsed years; and the values of the six storage nodes placed in an ascending order are 1.0, 1.1, 2.0, 2.0, 2.1, and 2.3. The storage nodes having the first three attribute values form a single major group, and the storage nodes having the other three attribute values form another major group.

Third Method

The group creation unit 540 arranges the storage nodes 100, 200, 300, and 400, according to an attribute value. The arranged storage nodes 100, 200, 300, and 400 are divided into two groups, and the variance of the attributes in the groups is seen. The two groups are formed in such a manner that the sum of the two variance values is minimized. Each major group should contain two or more storage nodes.

For example, suppose that there are six storage nodes; the obtained attribute is elapsed years; and the values of the six storage nodes placed in an ascending order are 1.0, 1.1, 2.0, 2.0, 2.1, and 2.3. The sum of the variance values depends on grouping, as follows:

$$(1.0,1.1)+(2.0,2.0,2.1,2.3)=0.005+0.02=0.025$$

$$(1.0,1.1,2.0)+(2.0,2.1,2.3)=0.303+0.023=0.326$$

$$(1.0,1.1,2.0,2.0)+(2.1,2.3)=0.303+0.02=0.323$$

Since the smallest value in the example given above is 0.025, the first and second storage nodes form a first major group, and the third, fourth, fifth, and sixth storage nodes form a second major group.

Through the grouping by any of the first to third methods described above, the risk of simultaneous failures in the storage devices forming a single group is dispersed, and the security and reliability are improved.

A process of moving distributed data, performed by the logical volume management unit 510, will next be described.

Figure 9:
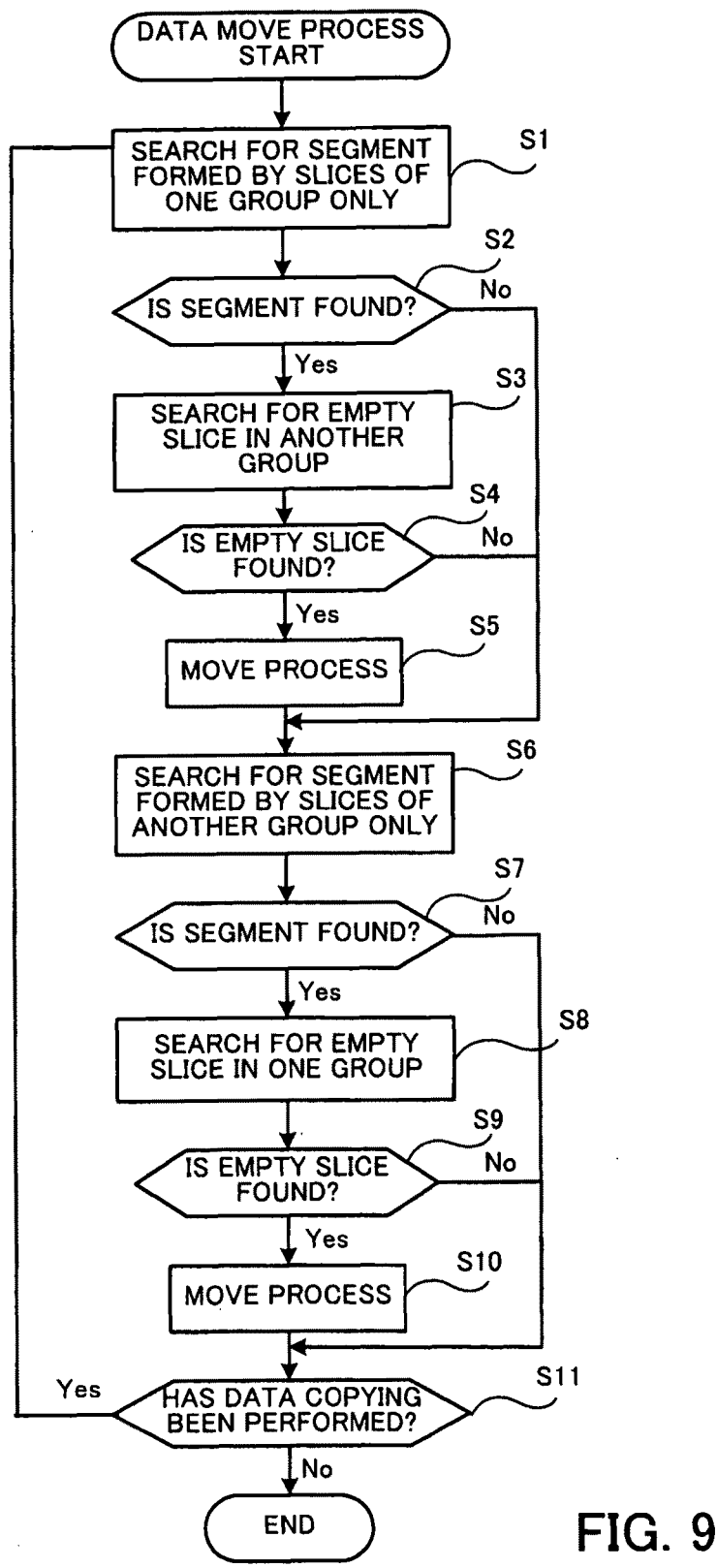
FIG. 9 is a flowchart illustrating a process of moving distributed data, performed to allocate data in accordance with grouping, if the grouping is performed after a logical volume is allocated is in a no-group state.

FIG. 9 is a flowchart illustrating the process of moving the distributed data to allocate data in accordance with grouping, if the grouping is performed after the logical volume is allocated in a no-group state.

First, a segment formed by slices of group A (one group) only is searched for (step S1).

If such a segment cannot be found (No in step S2), the process goes to step S6. If that type of segment can be found (Yes in step S2), a free slice in group B (the other group) is searched for (step S3).

If no free slice can be found (No in step S4), the process goes to step S6. If a free slice can be found (Yes in step S4), a move process is performed (step S5). More specifically, the distributed data in one of the slices forming the segment, found in group A, is copied into the free slice found in group B. Then, the source slice in group A is discarded, and the destination slice in group B becomes the slice forming the segment.

Then, a segment formed by slices in group B only is searched for (step S6).

If such a segment cannot be found (No in step S7), the process goes to step S11. If that type of segment can be found (Yes in step S7), a free slice in group A is searched for (step S8).

If no free slice can be found (No in step S9), the process goes to step S11. If a free slice can be found (Yes in step S9), a move process is performed (step S10). More specifically, the distributed data in one of the slices forming the segment, found in group B, is copied into the free slice found in group A. Then, the source slice in group B is discarded, and the destination slice in group A becomes the slice forming the segment.

Then, it is determined whether data copying has been performed (whether the process of at least either step S5 or step S10 is executed) (step S1).

If data copying has been performed (Yes in step S11), the process goes to step S1 to see whether further data can be moved, and the operation continues as described above.

If data copying has not been performed (No in step S11), it is judged that there is no more segment having both slices in the same group or that data cannot be moved further, and the process ends.

In the process of moving distributed data, a single distributed data item is moved at one time. If there is a plurality of distributed data items to be moved, the process is repeated the corresponding number of times.

The result of the process of moving the distributed data is reported to the data management units 140 of the storage nodes 100, 200, 300, and 400 and the logical volume access control unit 610 of the access node 600.

The process of moving the distributed data will be described next by using an example.

FIGS. 10A and 10B are diagrams illustrating examples of the process of moving distributed data.

In the example in FIG. 10A, the distributed data of the primary slice P4 in the slice 224 is moved to the slice 423, and the slice 423 becomes the primary slice P4.

Next, the distributed data of the primary slice P2 in the slice 425 is moved to the slice 224, and the slice 224 becomes the primary slice P2.

Then, the distributed data of the primary slice P6 in the slice 125 is moved to the slice 425, and the slice 425 becomes the primary slice P6. Now, the distributed data and the redundant distributed data are allocated to groups A and B in such a manner that each distributed data item and the redundant distributed data item having the same content as the distributed data item are not placed in the same group, as illustrated in FIG. 10B.

An example of initialization of the distributed storage system will be described next. In the example, the system operation is performed by connecting the storage nodes 100 to 400 to storage devices 1110, 1210, 1310, and 1410 containing no data in place of the storage devices 110, 210, 310, and 410.

In this operation, grouping is performed first. The grouping can be performed as described earlier. A method of allocating a new logical volume by the logical volume management unit 510 will be described below.

Figure 11A:
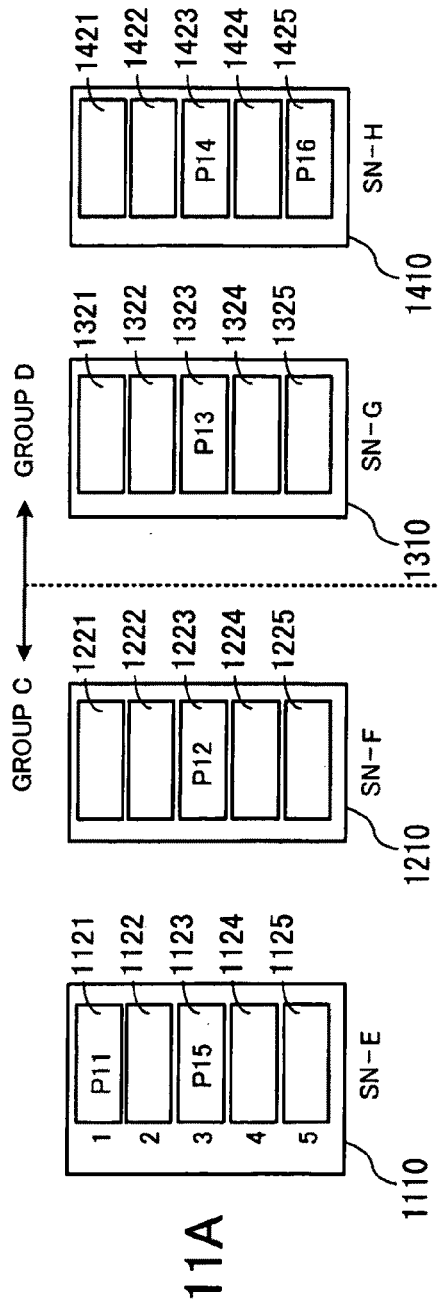
FIGS. 11A and 11B are diagrams illustrating how a new logical volume is allocated to storage nodes after grouping.
Figure 11B:
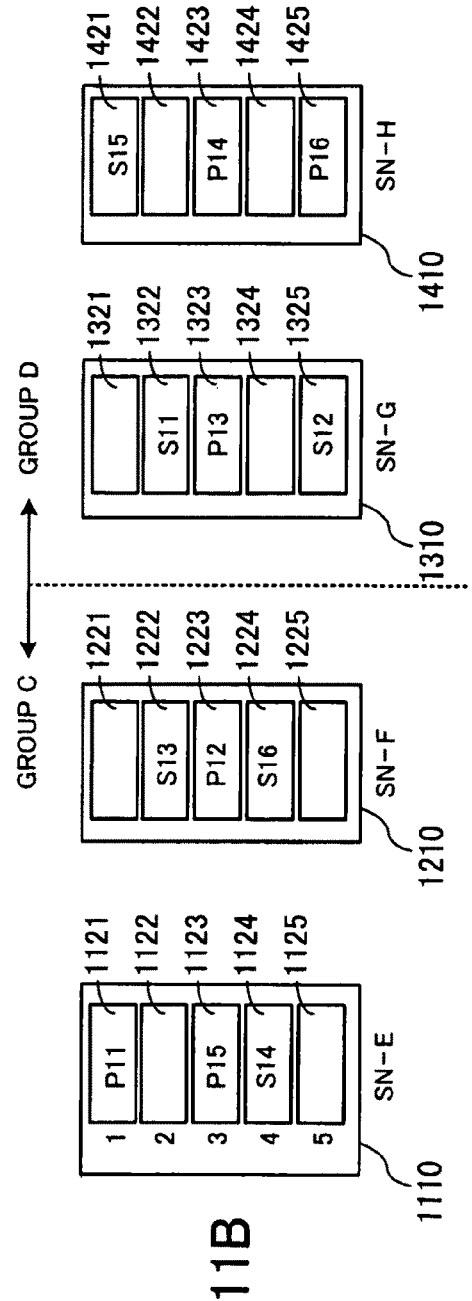

FIGS. 11A and 11B are diagrams illustrating how a new logical volume is allocated to storage nodes after grouping.

In FIGS. 11A and 11B, two groups, C and D, have been created. The description of the storage nodes will be omitted. The group C has the storage devices 1110 and 1210, and the group D has the storage devices 1310 and 1410.

The storage nodes above the storage devices 1110, 1210, 1310, and 1410 are given node identifiers 'SN-E', 'SN-F', 'SN-G', and 'SN-H', respectively, to identify the storage nodes.

The logical volume management unit 510 first allocates prepared primary slices P11 to P16 to the storage devices 1110 to 1410, having free slices, irrespective of the groups.

In FIG. 11A, the primary slices P11 and P15 are allocated to slices 1121 and 1123, respectively, in the storage device 1110, the primary slice P12 is allocated to a slice 1223 in the storage device 1210, the primary slice P13 is allocated to a slice 1323 in the storage device 1310, and the primary slices P14 and P16 are allocated to slices 1423 and 1425, respectively, in the storage device 1410.

The secondary slices are allocated to free slices in storage devices in groups other than the groups containing the primary slices.

Since the primary slices P11, P12, P15 are allocated to group C, the secondary slices S11, S12, and S15 are allocated to group D. In FIG. 11B, the secondary slices S11 and S12 are allocated to slices 1322 and 1325, respectively, in the storage device 1310, and the secondary slice S15 is allocated to a slice 1421 in the storage device 1410. Since the primary slices P13, P14, and P16 are allocated to group D, the secondary slices S13, S14, and S16 are allocated to group C. In FIG. 11B, the secondary slice S14 is allocated to a slice 1124 in the storage device 1110, and the secondary slices S13 and S16 are allocated to slices 1222 and 1224, respectively, in the storage device 1210.

In another method, the control node 500 may allocate the primary slices P11 to P16 to the storage devices 1110 and 1210 in group C and the secondary slices S11 to S16 to the storage devices 1310 and 1410 in group D.

The grouping can improve the security and reliability because data can be fetched from a storage device in one group even if the storage devices included in the other group go wrong at the same time.

In the distributed storage system of the embodiment, the logical volume management unit 510 divides the storage devices 110 to 410 into two groups according to the attributes, and segments are formed by slices included in the different groups, as described above. This can protect data even if all the storage devices in a group go wrong.

Further, it is easy to cancel or reorganize the grouping during the operation of the system (storage nodes).

If a new storage device is added to the system (storage nodes) during its operation, the groups can be reorganized easily.

The present embodiment can be easily applied to a system that has been operated without grouping (without the concept of grouping).

The functions described above can be implemented by a computer. In that case, a program describing the processes of the functions to be provided by the control node 500 is provided. By executing the program on the computer, the functions described above are implemented on the computer. The program describing the processes can be recorded on a computer-readable recording medium. Computer-readable recording media include magnetic recording devices, optical discs, magneto-optical recording media, and semiconductor memories. The magnetic recording devices include hard disk drives (HDDs), flexible disks (FDs), and magnetic tapes. The optical discs include digital versatile discs (DVDs), DVD random access memories (DVD-RAMs), compact disc read only memories (CD-ROMs), and compact disc recordables/rewritables (CD-Rs/RWs). The magneto-optical recording media include magneto-optical disks (MOs).

To distribute the program, a DVD, a CD-ROM, or any other type of transportable recording medium with the program recorded on it is sold, for instance. The program can also be stored in a storage device of a server computer and transferred from the server computer to another computer through a network.

The computer for executing the storage management program stores the program recorded on the transportable recording medium or the program transferred from the server computer in its storage device, for example. The computer reads the program from the storage device and executes the programmed processes. The computer may also read the program directly from the transportable recording medium and execute the programmed processes. The computer can also receive the program transferred from the server computer and execute the programmed processes each time the program is received.

According to the present embodiment, the group creation unit groups the storage nodes according to the attributes, the data allocation unit allocates data in such a manner that each distributed data item and the redundant distributed data item having the same content as the distributed data item will not be placed in the same group. Therefore, if a plurality of data items are destroyed in a single group, the data can be restored in another group. The data can be easily protected from being lost.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that various changes, substitutions and alterations could be made hereto without departing from the spirit and scope of the invention.

What is claimed is:

1. A computer-readable, non-transitory recording medium encoded with a storage management program for managing data stored in a plurality of storage nodes having storage devices in a distributed storage system, the storage management program making a computer function as:
   an attribute collection unit which collects attributes of the storage nodes;
   a group creation unit which classifies the storage nodes into at least two groups, including first and second groups, in accordance with the attributes of the storage nodes collected by the attribute collection unit; and
   a data allocation unit which moves, upon detecting that two different storage devices respectively storing distributed data and redundant distributed data both belonging to the first group of storage nodes, either the distributed data or the redundant distributed data from the first group of storage nodes to the second group of storage nodes.

2. The computer-readable, non-transitory recording medium having a storage management program recorded thereon according to claim 1, wherein the attribute collection unit collects the attributes of the storage devices managed by the storage nodes.

3. The computer-readable, non-transitory recording medium having a storage management program recorded thereon according to claim 1, wherein the data allocation unit moves either the distributed data or the redundant distributed data to a storage device having a free storage area.

4. The computer-readable, non-transitory recording medium having a storage management program recorded thereon according to claim 1, wherein the data allocation unit moves either the distributed data or the redundant distributed data, in accordance with management information that includes position information of the distributed data and redundant distributed data in the storage devices.

5. The computer-readable, non-transitory recording medium having a storage management program recorded thereon according to claim 4, the program making the computer function further as a management information storage unit which stores the management information of all the storage nodes,
   the data allocation unit obtaining the position information of the distributed data and the position information of the corresponding redundant distributed data from the management information storage unit.

6. The computer-readable, non-transitory recording medium having a storage management program recorded thereon according to claim 1, wherein the attribute collection unit adds the attributes to a heart-beat signal.

7. A storage management method for managing data stored in a plurality of storage nodes having storage devices in a distributed storage system, the storage management method comprising:

collecting attributes of the storage nodes;

classifying the storage nodes into at least two groups, including first and second groups, in accordance with the collected attributes of the storage nodes; and moving, upon detecting that two different storage devices respectively storing distributed data and redundant distributed data both belonging to the first group of storage nodes, either the distributed data or the redundant distributed data from the first group of storage nodes to the second group of storage nodes.

8. The storage management method according to claim 7, wherein the collecting collects the attributes of the storage devices managed by the storage nodes.

9. The storage management method according to claim 7, wherein the moving moves either the distributed data or the redundant distributed data to a storage device having a free storage area.

10. The storage management method according to claim 7, wherein the moving moves either the distributed data or the redundant distributed data, in accordance with management information that includes position information of the distributed data and redundant distributed data in the storage devices.

11. The storage management method according to claim 10, further comprising storing the management information of all the storage nodes.

12. The storage management method according to claim 7, wherein the attribute collection unit adds the attributes to a heart-beat signal.

13. A storage management apparatus for managing data stored in a plurality of storage nodes having storage devices in a distributed storage system, the storage management apparatus comprising:

a memory;

a processor coupled to the memory, the processor executing a procedure comprising:

collecting attributes of the storage nodes;

classifying the storage nodes into at least two groups, including first and second groups, in accordance with the attributes of the storage nodes; and moving, upon detecting that two different storage devices respectively storing distributed data and redundant distributed data corresponding thereto both belonging to the first group of storage nodes, either the distributed data or the redundant distributed data from the first group of storage nodes to the second group of storage nodes.

14. The storage management apparatus according to claim 13, wherein the collecting collects the attributes of the storage devices managed by the storage nodes.

15. The storage management apparatus according to claim 13, wherein the moving moves either the distributed data or the redundant distributed data to a storage device having a free storage area.

16. The storage management apparatus according to claim 13, wherein the moving moves either the distributed data or the redundant distributed data in accordance with management information that includes position information of the distributed data and redundant distributed data in the storage devices.

17. The storage management apparatus according to claim 16, further comprising storing the management information of all the storage nodes, and obtaining the position information of the distributed data and the position information of the redundant distributed data.

18. The storage management apparatus according to claim 13, further comprising adding the attributes to a heart-beat signal.

* * * * *